United States Patent [19]

Nabiullin

[11] 4,042,761
[45] Aug. 16, 1977

[54] CHEMICAL SOURCE OF CURRENT AND METHOD FOR ITS ASSEMBLY

[76] Inventor: Faat Khatovich Nabiullin, 3 Mytischinskaya ulitsa, 14a, kv. 90, Moscow, U.S.S.R.

[21] Appl. No.: 641,575

[22] Filed: Dec. 17, 1975

[30] Foreign Application Priority Data

Dec. 24, 1974 U.S.S.R. .............................. 2082916
Dec. 24, 1974 U.S.S.R. .............................. 2082915

[51] Int. Cl.² ........................................... H01M 6/02
[52] U.S. Cl. ................................. 429/165; 429/185; 29/623.2
[58] Field of Search ............... 136/107, 133, 169, 175; 429/165, 185, 163, 164; 29/623.2

[56] References Cited

U.S. PATENT DOCUMENTS

| 3,510,358 | 5/1970 | Nabiullin et al. | 136/107 |
| 3,864,171 | 2/1975 | Mills et al. | 136/107 |
| 3,948,683 | 4/1976 | Garcin | 136/107 |
| 3,951,690 | 4/1976 | Sanchez | 136/133 |

Primary Examiner—Anthony Skapars

[57] ABSTRACT

A chemical source of current, comprising a positive electrode and a negative electrode coaxially arranged in a casing, the electrodes being separated by an ion-conducting diaphragm. A metal lid which is in contact with the tap of the negative electrode and is provided with holes is covered by a plastic gasket and a sealing coupling, at least one end of the negative electrode tap having at least one groove to receive the material of the sealing coupling.

5 Claims, 3 Drawing Figures

CHEMICAL SOURCE OF CURRENT AND METHOD FOR ITS ASSEMBLY

The present invention relates to chemical sources of current and methods for their assembly.

The source of the present invention can be used as an autonomous power source for different types of household electric appliances, including radios, tape recorders, electromechanical toys, pocket lights, pocket calculators, flash lights, etc.

The past years have seen a tendency towards replacing Leclanche cells by alkaline manganese-zinc sources of current with their improved electrical characteristics and reduced consumption of active materials. A barrier to this trend, however, is the complexities and the great amount of time of painstaking labor involved in the manufacture of alkaline sources of current.

For example, in widely known chemical sources of current, contact between the negative electrode tap and the lid of the source is attained by welding, soldering or riveting them together. If the contact is achieved by simply pressing them against one another, this is done with the aid of springs, rubber elements, etc.

In combination with other components and devices, the foregoing features make the chemical source of current leaktight, with any leakage of the electrolyte being eliminated, and provide for release of gases. On the other hand, these features account for complexities in the design and manufacture of such sources and, consequently, for their high production costs.

There is known a chemical source of current which comprises a positive electrode and a negative electrode coaxially arranged in a casing and separated by an ion-conducting diaphragm, a tap of the negative electrode, and a metal lid which is in contact with the latter and is provided with holes covered by the plastic material of a gasket with a sealing coupling.

In sources of this type, contact between the tap of the negative electrode and the metal lid is attained by simply pressing one of said components against the other. In sources of this type, provision is made for release of gases; such sources are sealed, so there is no leakage of electrolyte.

Gases are released through the area of conjugation between the tap and the coupling, then through the gap between the lid and the gasket, and, finally, into the atmosphere through the holes in the metal lid.

There is also known a method for the assembly of a chemical source of current of the above type, whereby in the casing of the current source there are placed a positive electrode, a negative electrode, an ion-conducting diaphragm of thickened electrolyte, and a tap of the negative electrode, after which there is installed a metal lid with a plastic gasket and a sealing coupling, which lid is in contact with said negative electrode tap; finally, the source is sealed off by rolling down the edges of the casing.

The ratio between the diameter of the coupling hole and the diameter of the tap is less than one (for example, 0.8:1), so the coupling is tightly fitted over the tap. This means that a certain excess pressure is required for the release of gases from the casing. This pressure must be of the order of 1 ÷ 3 atm.

The magnitude of pressure required for the passage of gases through the coupling depends upon a number of factors, including the material of the coupling, casting conditions and changes in the properties of the material in the course of storage.

Hence, gases may be released from the casing, especially in the case of long storage, at pressures somewhat in excess of the estimated or original pressures.

Also, in the course of long storage of the chemical source under review, alkali penetrates through microchannels in the sealing coupling, comes into contact with the air and is carbonated by carbon dioxide contained in the air.

The microchannels are gradually plugged by carbonates, and the pressure inside the source increases. Excessive pressure in the casing presses the metal lid away from the negative electrode tap, so there is no contact between them.

As it has been already mentioned above, the negative electrode tap is tightly inserted into the coupling in order to prevent leakage of alkali. The gasket with the sealing coupling are made from polyethylene; the tap of the negative electrode is made of steel and tin-plated; clearly, the friction coefficient between these materials is quite high. As a result, the tap does not extend through the coupling, but is only inserted to some extent into the hole in the latter and is in contact with the lid only because of the pressure exerted upon the lid by the rolled-down edge of the casing. The coupling is compressed along its axis, and the compressed material tends to move the tap away from the lid.

When the negative electrode tap is installed in place, large zinc particles may get under it. In the course of time, these particles are either ground or dissolve in the alkali solution. As a result, the tap's positioning becomes looses, and under the pressure of the compressed material of the coupling, the tap moves away from the lid, so the contact between the two is broken.

Additionally, the known methods of assembly of chemical sources of current of known types often lead to scratching and tearing of the coupling's wall as the tap of the negative electrode is inserted into the coupling. In other words, in the walls of the coupling there appear microchannels, wherethrough the alkali may reach the lid of the current source. Such microchannels may also be produced in the course of casting the coupling. Furthermore, the tap of the negative electrode may have microholes and indentures, because its tin plating is microporous.

The foregoing factors account for the penetration of the alkali into the gap between the coupling and the negative electrode tap. As a result, the alkali gets to the lid, especially in the area of contact between the tap and the lid. The formation of carbonates between the negative electrode tap and the lid may also break the electric contact therebetween.

It is an object of the present invention to provide a chemical source of current and a method for the assembly of such source.

It is another object of the invention to ensure reliable contact between the lid and the tap of the negative electrode.

It is still another object of the invention to prevent the penetration of alkali to the lid of the current source and thus improve the latter's performance.

It is yet another object of the invention to prolong the shelf life of the chemical source of current.

The foregoing objects are attained by providing a chemical source of current, comprising a positive electrode and a negative electrode coaxially arranged in a casing and separated by an ion-conducting diaphragm, and a tap of the negative electrode a metal lid which is in contact with the tap of the negative electrode and provided with holes covered by the plastic material of a gasket with a sealing coupling, there being, in accordance with the invention, at least one groove on at least one end of the tap of the negative electrode, said groove being intended to receive the material of the sealing coupling.

It is expedient that the end of the internal side of the coupling should be placed on the edge of the groove of the negative electrode's tap.

It is also expedient that the edges of the metal lid are rolled down taper-like, with the angle at the vertex being 160° to 175° and pointing into the current source.

The objects of the present invention are further attained by providing a method for the assembly of a chemical source of current, whereby a positive electrode and a nagative electrode are placed in the source's casing and separated by an ion-conducting diaphragm, which is followed by installing in place a tap of the negative electrode and a metal lid which is in contact with the tap of the negative electrode, said lid being provided with holes covered by the plastic material of a gasket with a sealing coupling, said operations being followed by sealing the chemical source of current by means of compressing the gasket between the metal lid and the casing and rolling down the edges of the casing; according to the invention, a sealing compound is introduced into the coupling's hole prior to fitting said coupling over the negative electrode tap, the sealing coupling being moved, following the rolling down of the casing's edges, over the negative electrode tap, away from the metal lid and into the chemical source of current.

It is expedient that the sealing coupling should be moved over the tap of the negative electrode away from the metal lid and into the chemical source of current by supplying, under pressure, gas or liquid through the holes in the metal lid to the gasket with said sealing coupling.

The present invention ensures a reliable contact between the tap of the negative electrode and the lid without resorting to welding or soldering. The invention completely eliminates leakage of alkali from the casing along the negative electrode tap. At the same time, the invention provides for release of gases from the casing when the pressure is above the permissible level.

Other objects and advantages of the present invention will become more apparent from the following detailed description of a preferred embodiment thereof to be read in conjunction with the accompanying drawings, wherein.

Figure 1:
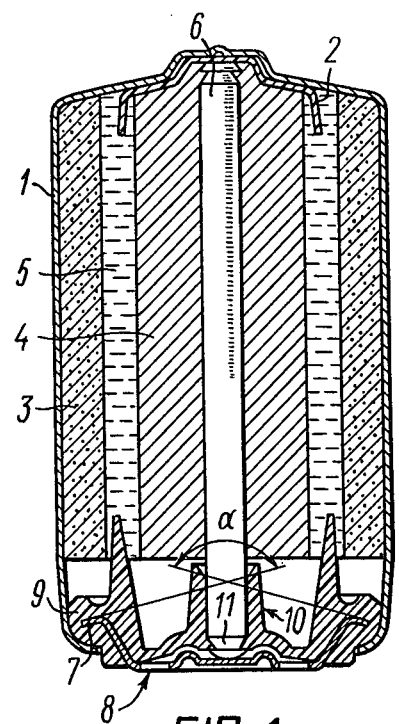
FIG. 1 is a sectional view of a chemical source of current in accordance with the invention.

Referring now to the attached drawings, the proposed chemical source of current comprises a casing 1 which houses a gasket 2, a positive electrode 3 and a negative electrode 4 separated by an ion-conducting diaphragm 5. Placed in the center of the negative electrode 4 is a tap 6. The casing 1 is covered by a lid 7 having holes 8 covered by the plastic material of a gasket 9 with a sealing coupling 10. The lid 7 is in contact with the tap 6 of the negative electrode 4. The tap 6 is provided with a groove 11 on whose edge there is placed the end of the internal side of the sealing coupling 10.

Figure 2:
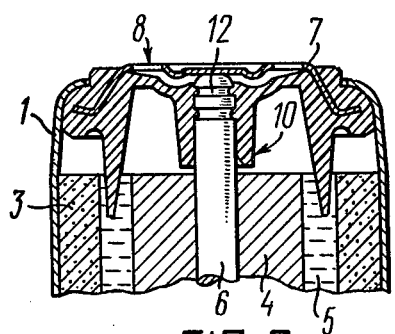
FIG. 2 shows an alternative embodiment of the negative electrode tap in accordance with the invention.

There may be provided several grooves 12 (FIG. 2) at the end of the tap 6 (for example, two). If that is the case, the material of the sealing coupling 10 is received in the grooves 12, whereby the tap 6 is firmly held in place.

Figure 3:
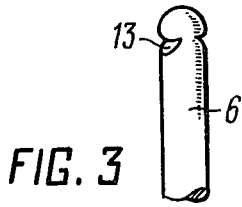
FIG. 3 shows another alternative embodiment of the negative electrode tap in accordance with the invention.

The groove 12 (FIG. 2) may be helical; it may also be composed of separate portions in the form of notches 13 (FIG. 3).

The current source of the present invention is assembled as follows. In the casing 1 (FIG. 1) there are placed the positive electrode 3, the gasket 2, the negative electrode 4, and the ion-conducting diaphragm 5 of thickened electrolyte. In the center of the negative electrode 4 there is placed the tap 6. Sealing compound is applied onto the internal edge of the casing 1.

The casing 1 is covered with the lid 7 provided with the holes 8 and the gasket 9 which is integral with the sealing coupling of a plastic material. As the lid 7 is installed, the end of the tap is received in the hole of the coupling 10, into which a sealing compound has been introduced. The rim of the lid 7 is bent at an angle at the vertex of 160 ÷ 175°.

The current source is then sealed off by compressing the casing 1 over the portion where the end of the lid 7 is located. The lid 7 is held in place by the rolled down edge of the casing 1.

The sealing coupling 10 is moved over the tap 6 away from the lid into the current source. For this purpose, gas or liquid are supplied under pressure through the holes 8 in the lid 7 to the gasket 9.

In order to make it unnecessary to orient the tap 6 in the course of assembly, the groove 11 may be provided at both ends of the tap 6.

What is claimed is:

1. A chemical source of current, comprising: a casing with a bottom;
    a first insulating gasket placed on said bottom of said casing;
    a positive electrode arranged in said casing;
    an axial through cavity in said positive electrode;
    a negative electrode disposed in said axial through cavity of said positive electrode on said first insulating gasket;
    an axial through cavity in said negative electrode;
    an ion-conducting diaphragm arranged between said positive and negative electrodes and manufactured simultaneously with said negative electrode;
    a tap for said negative electrode, disposed in said axial through cavity of said negative electrode;
    a metal lid which is in contact with said tap of said negative electrode;
    holes provided in said metal lid;
    a second insulating gasket under said metal lid;
    a sealing coupling which is integral with said insulating gasket and fitted over said tap of said negative electrode;
    said sealing coupling having an internal surface engaging said tap;
    at least one groove provided in said tap to receive said sealing coupling.

2. A chemical source of current as claimed in claim 1, wherein said sealing coupling has an end whose internal surface is placed upon the edge of said groove of said negative electrode tap.

3. A chemical source of current as claimed in claim 1, wherein the edge of said metal lid is bent to form an angle at the vertex of 160° to 175° inside the current source.

4. A method for the assembly of a chemical source of current, including the following steps:
placing a positive electrode in a casing;
arranging a first gasket inside said positive electrode, installing a negative electrode and arranging a ion-conducting diaphragm between said positive and negative electrodes;
placing a tap of said negative electrode inside said negative electrode;
introducing sealing compound into a hole of a sealing coupling which is integral with a second insulating gasket;
fitting said sealing coupling over said tap of said negative electrode and, simultaneously, covering said casing with the second insulating gasket;
compressing said second insulating gasket between a metal lid and said casing;
rolling down the edge of said casing;
moving said sealing coupling over said tap of said negative electrode away from said metal lid into the chemical source of current.

5. A method as claimed in claim 4, whereby said sealing coupling is moved over said tap of said negative electrode away from said metal lid inside the chemical source of current by supplying, under pressure, gas or liquid through the holes in said metal lid to said second insulating gasket with said sealing coupling.

* * * * *